US009845956B2

(12) United States Patent
Ziminsky et al.

(10) Patent No.: US 9,845,956 B2
(45) Date of Patent: Dec. 19, 2017

(54) SYSTEM AND METHOD FOR CONTROL OF COMBUSTION DYNAMICS IN COMBUSTION SYSTEM

(71) Applicant: General Electric Company, Schenectady, NY (US)

(72) Inventors: Willy Steve Ziminsky, Greenville, SC (US); Sarah Lori Crothers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 14/249,158

(22) Filed: Apr. 9, 2014

(65) Prior Publication Data

US 2015/0292744 A1 Oct. 15, 2015

(51) Int. Cl.
*F23R 3/46* (2006.01)
*F02C 7/24* (2006.01)
*F23C 5/08* (2006.01)
*F23R 3/42* (2006.01)

(52) U.S. Cl.
CPC .............. *F23R 3/42* (2013.01); *F02C 7/24* (2013.01); *F23R 2900/00014* (2013.01)

(58) Field of Classification Search
CPC ............ B23P 6/002; F23R 2900/00005; F23R 2900/00019; F23R 3/283; F23R 3/286; F23R 3/346; F23R 3/42; F23R 2900/00014; F23R 3/002; F23R 3/46; H01F 1/00; F23D 2210/00; F02C 7/24; F23C 5/08
USPC ........................................... 415/2.1; 431/114
See application file for complete search history.

(56) References Cited

U.S. PATENT DOCUMENTS

| 2,072,826 | A | | 3/1937 | Riley |
|---|---|---|---|---|
| 4,044,553 | A | | 8/1977 | Vaught |
| 4,620,414 | A | | 11/1986 | Christ |
| 4,677,822 | A | * | 7/1987 | Iizuka ................... F23R 3/26 60/39.23 |
| 4,724,670 | A | | 2/1988 | Greer |
| 4,901,694 | A | | 2/1990 | Sakita |
| 5,159,807 | A | | 11/1992 | Forestier |

(Continued)

FOREIGN PATENT DOCUMENTS

| EP | 1605205 | 12/2005 |
|---|---|---|
| EP | 1632718 | 3/2006 |

(Continued)

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — J. Gregory Pickett
*Assistant Examiner* — Gideon Weinerth
(74) *Attorney, Agent, or Firm* — Charlotte C. Wilson; Ernest G. Cusick; Frank A. Landgraff (57) ABSTRACT

The present disclosure generally relates to a system with a gas turbine engine including a first combustor and a second combustor. The first combustor includes a first end cover with a first geometry and the second combustor includes a second end cover with a second geometry. The first geometry has one or more geometric differences relative to the second geometry.

14 Claims, 3 Drawing Sheets

(56) References Cited

U.S. PATENT DOCUMENTS

| | | | |
|---|---|---|---|
| 5,211,004 A | 5/1993 | Black | |
| 5,319,931 A | 6/1994 | Beebe et al. | |
| 5,345,758 A | 9/1994 | Bussing | |
| 5,575,144 A | 11/1996 | Brough et al. | |
| 5,657,631 A | 8/1997 | Androsov | |
| 5,809,769 A | 9/1998 | Richards et al. | |
| 5,943,866 A | 8/1999 | Lovett et al. | |
| 5,946,902 A * | 9/1999 | Schutz | F02C 3/14 415/151 |
| 5,983,643 A * | 11/1999 | Kiesow | F23R 3/34 431/175 |
| 6,164,055 A | 12/2000 | Lovett et al. | |
| 6,360,525 B1 * | 3/2002 | Senior | F23R 3/12 60/747 |
| 6,430,930 B1 * | 8/2002 | Andersson | F23D 23/00 431/114 |
| 6,568,190 B1 * | 5/2003 | Tiemann | F23C 3/002 431/114 |
| 6,572,330 B2 * | 6/2003 | Burdgick | F01D 9/02 29/889.22 |
| 6,595,002 B2 * | 7/2003 | Weisenstein | F23D 11/36 431/1 |
| 6,625,569 B2 | 9/2003 | James et al. | |
| 6,820,431 B2 | 11/2004 | McManus et al. | |
| 7,266,945 B2 * | 9/2007 | Sanders | F23D 11/101 60/743 |
| 7,278,266 B2 | 10/2007 | Taware et al. | |
| 7,320,222 B2 | 1/2008 | Flohr et al. | |
| 7,331,182 B2 | 2/2008 | Graf et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,523,614 B2 | 4/2009 | Tanimura et al. | |
| 7,578,130 B1 * | 8/2009 | Kraemer | F23R 3/286 60/737 |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,805,922 B2 | 10/2010 | Bland | |
| 7,886,545 B2 | 2/2011 | Lacy et al. | |
| 7,908,072 B2 | 3/2011 | Tonno et al. | |
| 7,997,083 B2 | 8/2011 | Meadows et al. | |
| 8,112,216 B2 | 2/2012 | Davis, Jr. et al. | |
| 8,113,000 B2 | 2/2012 | Laster et al. | |
| 8,322,140 B2 | 12/2012 | Kim et al. | |
| 8,733,108 B2 * | 5/2014 | Kim | F23C 5/08 60/725 |
| 8,826,667 B2 * | 9/2014 | Melton | F23R 3/002 60/752 |
| 8,966,909 B2 | 3/2015 | Crothers et al. | |
| 9,027,349 B2 | 5/2015 | Miura et al. | |
| 9,151,502 B2 * | 10/2015 | Crothers | F02C 7/22 |
| 9,291,103 B2 * | 3/2016 | Belsom | F23R 3/286 |
| 9,303,875 B2 * | 4/2016 | Clemen | F02C 7/00 |
| 9,341,375 B2 * | 5/2016 | Kim | F23R 3/10 |
| 9,551,283 B2 * | 1/2017 | Crothers | F02C 7/22 |
| 2002/0157400 A1 * | 10/2002 | Schulten | F23R 3/46 60/772 |
| 2003/0144787 A1 | 7/2003 | Davis, Jr. et al. | |
| 2004/0083738 A1 | 5/2004 | McManus et al. | |
| 2004/0093851 A1 * | 5/2004 | Dawson | F23R 3/286 60/39.37 |
| 2005/0278108 A1 | 12/2005 | Norman et al. | |
| 2006/0041368 A1 | 2/2006 | Williams et al. | |
| 2006/0042261 A1 | 3/2006 | Taware et al. | |
| 2006/0107666 A1 | 5/2006 | Kothnur | |
| 2006/0254279 A1 | 11/2006 | Taware et al. | |
| 2007/0180831 A1 * | 8/2007 | Bland | F02C 9/26 60/773 |
| 2007/0199328 A1 | 8/2007 | Shah et al. | |
| 2008/0010966 A1 | 1/2008 | Taware et al. | |
| 2008/0053097 A1 * | 3/2008 | Han | F23R 3/286 60/737 |
| 2008/0268387 A1 * | 10/2008 | Saito | F23R 3/286 431/8 |
| 2009/0005951 A1 | 1/2009 | Frederick et al. | |
| 2009/0005952 A1 | 1/2009 | Tonno et al. | |
| 2009/0063003 A1 | 3/2009 | Meadows et al. | |
| 2009/0320483 A1 * | 12/2009 | Storey | F23D 11/38 60/747 |
| 2010/0132375 A1 * | 6/2010 | Tanimura | F02C 7/222 60/796 |
| 2010/0170254 A1 | 7/2010 | Venkataraman et al. | |
| 2010/0175380 A1 * | 7/2010 | Davis, Jr. | F23R 3/286 60/734 |
| 2010/0192578 A1 | 8/2010 | Singh et al. | |
| 2010/0232930 A1 | 9/2010 | Gregory | |
| 2010/0236214 A1 | 9/2010 | Wiedenhoefer et al. | |
| 2010/0313568 A1 | 12/2010 | Davis, Jr. et al. | |
| 2011/0048021 A1 * | 3/2011 | Slobodyanskiy | F01D 9/023 60/725 |
| 2011/0072826 A1 | 3/2011 | Narra et al. | |
| 2011/0076628 A1 * | 3/2011 | Miura | F23R 3/10 431/12 |
| 2011/0107765 A1 * | 5/2011 | Valeev | F02C 7/228 60/746 |
| 2011/0162370 A1 | 7/2011 | Kim et al. | |
| 2011/0179795 A1 * | 7/2011 | Johnson | F23R 3/28 60/725 |
| 2011/0203286 A1 * | 8/2011 | Wagner | F23C 3/00 60/752 |
| 2011/0308654 A1 | 12/2011 | Bothien et al. | |
| 2012/0006029 A1 | 1/2012 | Bilbao et al. | |
| 2012/0131923 A1 | 5/2012 | Elkady et al. | |
| 2012/0144832 A1 | 6/2012 | Herbon et al. | |
| 2012/0180487 A1 * | 7/2012 | Uhm | F23D 14/62 60/737 |
| 2012/0180488 A1 * | 7/2012 | Bailey | F23K 5/14 60/739 |
| 2013/0000312 A1 | 1/2013 | Kodukulla et al. | |
| 2013/0014514 A1 | 1/2013 | Romig et al. | |
| 2013/0042619 A1 * | 2/2013 | Bobba | F23R 3/002 60/725 |
| 2013/0045450 A1 * | 2/2013 | Uhm | F23R 3/26 431/8 |
| 2013/0340438 A1 * | 12/2013 | Abreu | F02C 7/222 60/772 |
| 2014/0020389 A1 * | 1/2014 | Melton | F23R 3/10 60/722 |
| 2014/0053528 A1 | 2/2014 | Crothers et al. | |
| 2014/0060063 A1 | 3/2014 | Boardman et al. | |
| 2014/0083102 A1 * | 3/2014 | Miura | F23R 3/286 60/737 |
| 2014/0109587 A1 * | 4/2014 | Crothers | F02C 7/22 60/776 |
| 2014/0123649 A1 * | 5/2014 | Portillo Bilbao | F23R 3/16 60/725 |
| 2014/0137535 A1 * | 5/2014 | Kim | F02C 7/24 60/39.37 |
| 2014/0137561 A1 | 5/2014 | Crothers et al. | |
| 2014/0216051 A1 * | 8/2014 | Johnson | F23R 3/04 60/776 |
| 2014/0238026 A1 | 8/2014 | Boardman et al. | |
| 2014/0238033 A1 | 8/2014 | Crothers et al. | |
| 2014/0238041 A1 | 8/2014 | Crothers et al. | |
| 2014/0245738 A1 * | 9/2014 | Crothers | F02C 7/228 60/725 |
| 2014/0245746 A1 * | 9/2014 | Srinivasan | F02C 7/18 60/779 |
| 2014/0260276 A1 * | 9/2014 | Westmoreland | F23R 3/286 60/746 |
| 2014/0260299 A1 | 9/2014 | Boardman et al. | |
| 2014/0338341 A1 | 11/2014 | Abreu | |
| 2014/0345287 A1 * | 11/2014 | Kulkarni | F23R 3/42 60/772 |
| 2015/0000299 A1 * | 1/2015 | Zuo | F02C 7/222 60/776 |
| 2015/0050605 A1 * | 2/2015 | Desi-Seulean | F23D 14/62 431/9 |

(56) References Cited

U.S. PATENT DOCUMENTS

| | | | |
|---|---|---|---|
| 2015/0165568 A1* | 6/2015 | Means | B23P 6/002 29/402.06 |
| 2015/0219336 A1* | 8/2015 | Crothers | F23R 3/34 60/726 |
| 2015/0219337 A1* | 8/2015 | Crothers | F23R 3/34 60/776 |
| 2015/0260407 A1* | 9/2015 | Crothers | F23R 3/346 60/776 |
| 2015/0285505 A1* | 10/2015 | Stevenson | F23R 3/34 60/725 |
| 2015/0285508 A1 | 10/2015 | Olson | |
| 2015/0292744 A1* | 10/2015 | Ziminsky | F23R 3/42 60/772 |
| 2015/0345402 A1* | 12/2015 | Crothers | F23N 1/022 60/776 |
| 2015/0345794 A1* | 12/2015 | Crothers | F23R 3/346 60/773 |
| 2015/0377138 A1* | 12/2015 | Crothers | F02C 7/22 60/776 |
| 2016/0040883 A1* | 2/2016 | Asai | F23R 3/002 60/737 |
| 2016/0091206 A1* | 3/2016 | Rathmann | F23R 3/002 60/752 |
| 2016/0177835 A1* | 6/2016 | Tardif | F01D 9/023 60/776 |
| 2016/0273449 A1* | 9/2016 | DiCintio | F23M 20/005 |
| 2016/0305337 A1* | 10/2016 | Crothers | F23R 3/34 |
| 2016/0305668 A1* | 10/2016 | Romig | F23R 3/343 |

FOREIGN PATENT DOCUMENTS

| | | |
|---|---|---|
| EP | 2031192 | 3/2009 |
| JP | 2009281720 A | 12/2009 |
| JP | 2012102733 A | 5/2012 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/276,700, filed May 13, 2014, Crothers et al.
U.S. Appl. No. 14/288,875, filed May 28, 2014, Crothers et al.
U.S. Appl. No. 14/288,974, filed May 28, 3014, Crothers et al.
U.S. Appl. No. 14/316,616, filed Jun. 26, 2014, Crothers et al.
U.S. Appl. No. 14/659,399, filed Mar. 16, 2015, DiCintio et al.
U.S. Appl. No. 14/249,158, filed Apr. 9, 2014, Ziminsky et al.
U.S. Appl. No. 14/171,001, filed Feb. 3, 2014, Crothers et al.
U.S. Appl. No. 14/192,687, filed Feb. 27, 2014, Crothers et al.
U.S. Appl. No. 14/207,041, filed Mar. 12, 2014, Crothers et al.
U.S. Appl. No. 14/248,194, filed Apr. 8, 2014, Stevenson et al.
U.S. Appl. No. 14/048,252, filed Oct. 8, 2013, Crothers et al.
U.S. Appl. No. 14/170,702, filed Feb. 3, 2014, Day et al.
U.S. Appl. No. 14/170,710, filed Feb. 3, 2014, Carnell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.

* cited by examiner

SYSTEM AND METHOD FOR CONTROL OF COMBUSTION DYNAMICS IN COMBUSTION SYSTEM

BACKGROUND

The disclosed subject matter relates generally to gas turbine systems, and more particularly, to a system and method for controlling combustion dynamics, and more specifically, for reducing modal coupling of combustion dynamics.

Gas turbine systems generally include a gas turbine engine having a compressor section, a combustor section, and a turbine section. The combustor section may include one or more combustors (e.g., combustion cans) with fuel nozzles configured to inject a fuel and an oxidant (e.g., air) into a combustion chamber within each combustor. In each combustor, a mixture of the fuel and oxidant combusts to generate hot combustion gases, which then flow into and drive one or more turbine stages in the turbine section. Each combustor may generate combustion dynamics, which occur when the combustor acoustic oscillations interact with the flame dynamics (also known as the oscillating component of the heat release), to result in a self-sustaining pressure oscillation in the combustor.

Combustion dynamics can occur at multiple discrete frequencies or across a range of frequencies, and can travel both upstream and downstream relative to the respective combustor. For example, the pressure and/or acoustic waves may travel downstream into the turbine section, e.g., through one or more turbine stages, or upstream into the fuel system. Certain downstream components of the turbine section can potentially respond to the combustion dynamics, particularly if the combustion dynamics generated by the individual combustors exhibit an in-phase and coherent relationship with each other, and have frequencies at or near the natural or resonant frequencies of the components. In general, "coherence" refers to the strength of the linear relationship between two dynamic signals, and is strongly influenced by the degree of frequency overlap between them. In the context of combustion dynamics, "coherence" is a measure of the modal coupling, or combustor-to-combustor acoustic interaction, exhibited by the combustion system. Accordingly, a need exists to control the combustion dynamics, and/or modal coupling of the combustion dynamics, to reduce the possibility of any unwanted sympathetic vibratory response (e.g., resonant behavior) of components in the turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine including a first combustor and a second combustor. The first combustor includes a first end cover with a first geometry and the second combustor includes a second end cover with a second geometry. The first geometry has one or more geometric differences relative to the second geometry.

In a second embodiment, a system includes a first turbine combustor having a first end cover with a first geometry. The first geometry is facing a first head end chamber, and the first geometry is configured to at least partially control first acoustics and/or first combustion dynamics in the first turbine combustor.

In a third embodiment, a method includes controlling first acoustics and/or first combustion dynamics in a first combustor with a first geometry of a first end cover facing a first head end chamber of the first combustor. The method further includes controlling second acoustics and/or second combustion dynamics in a second combustor with a second geometry of a second end cover facing a second head end chamber of the second combustor. The first and second geometries have at least one difference to vary the second acoustics relative to the first acoustics and/or to vary the second combustion dynamics relative to the first combustion dynamics.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward reducing combustion dynamics and/or modal coupling of combustion dynamics, to reduce unwanted vibratory responses in downstream components in a gas turbine system by varying geometries of one or more turbine combustors, e.g., modified end cover configurations. A gas turbine combustor (or combustor assembly) may generate combustion dynamics due to the combustion process, characteristics of intake fluid flows (e.g., fuel, oxidant, diluent, etc.) into the combustor, and various other factors. The combustion dynamics may be characterized as pressure fluctuations, pulsations, oscillations, and/or waves at certain frequencies. The fluid flow characteristics may include velocity, pressure, fluctuations in velocity and/or pressure, variations in flow paths (e.g., turns, shapes, interruptions, etc.), or any combination thereof. Collectively, the combustion dynamics can potentially cause vibratory responses and/or resonant behavior in various components upstream and/or downstream from the combustor. For example, the combustion dynamics (e.g., at certain frequencies, ranges of frequencies, amplitudes, combustor-to-combustor phases, etc.) can travel both upstream and downstream in the gas turbine system. If the gas turbine combustors, upstream components, and/or downstream components have natural or resonant frequencies that are driven by these pressure fluctuations (i.e. combustion dynamics), then the pressure fluctuations can potentially cause vibration, stress, fatigue, etc. The components may include combustor liners, combustor flow sleeves, combustor caps, fuel nozzles, turbine nozzles, turbine blades, turbine shrouds, turbine wheels, bearings, fuel supply assemblies, or any combination thereof. The downstream components are of specific interest, as they are more sensitive to combustion tones that are in-phase and coherent. Thus, reducing coherence specifically reduces the possibility of unwanted vibrations in downstream components.

As discussed in detail below, the disclosed embodiments may equip one or more gas turbine combustors with a modified end cover configuration (e.g., end cover geometry) to modify the acoustic response of the combustor, and therefore the combustion dynamics (e.g., pressure fluctuations, pulsations, oscillations, or waves) of the gas turbine combustor, e.g., varying the frequency, amplitude, combustor-to-combustor phase, range of frequencies, or any combination thereof. In particular, the modified end cover configuration may alter the acoustic response of the combustor, and therefore the combustion dynamics, in a way to substantially reduce or eliminate any unwanted vibratory response of components upstream and/or downstream of the turbine combustor, as well as the gas turbine combustors. For example, the modified end cover configuration may result in combustion dynamics frequencies that are different, phase shifted, smeared or spread out over a greater frequency range, or any combination thereof, relative to any resonant frequencies of the components in the gas turbine system. By varying the end cover geometry, a range of acoustic path lengths are introduced, and therefore a range of acoustic wavelengths that can be excited, effectively smearing out the acoustic response of the combustor. Depending on the specific details of the end cover geometry, the range of acoustic wavelengths may also introduce a phase lag across the range of acoustic wavelengths that could be excited, which will encourage destructive interference of the acoustic wavelengths. Since the acoustic response of the combustor interacts with the flame dynamics inherent to the combustion process, varying the acoustic response of the combustor in terms of the variation in acoustic wavelength and/or increased phase lag among the acoustic wavelengths, effectively smears out the frequency content of the combustion dynamics tones over a greater frequency range, reducing combustion dynamics amplitudes, and/or preventing modal coupling of combustion dynamics among the combustors.

In addition to modifications on a combustor level (i.e., individual turbine combustor), the disclosed embodiments may vary the end cover configurations (e.g., end cover geometries) such that there is at least one geometrical difference between the end cover geometry of one combustor relative to the end cover geometry of another combustor.

Indeed, varying end cover configurations among a plurality of gas turbine combustors varies the acoustics and therefore, combustion dynamics, from combustor to combustor in a manner to reduce the combustion dynamics amplitudes and/or modal coupling of the combustion dynamics among the plurality of gas turbine combustors. For example, the modified end cover configurations may result in combustor to combustor variations in the acoustic response of the combustor, and therefore, combustion dynamics frequencies (e.g., frequencies that are different, phase shifted, smeared or spread out over a greater frequency range, or any combination thereof), thereby reducing the possibility of modal coupling of the combustors, particularly at frequencies that are aligned with resonant frequencies of the components of the gas turbine system.

Accordingly, a gas turbine engine may employ a variety of modified end cover configurations to alter the acoustic response of the combustor and therefore mitigate unwanted vibratory responses in the gas turbine system components caused by combustion dynamics in the gas turbine combustors. For example, the geometry of the end cover of each gas turbine combustor may include one or more angled surfaces, curved surfaces (e.g., concave surfaces, convex surfaces, constant curvatures, or varying curvatures), flat surfaces, recesses, protrusions, polygonal surfaces (e.g., triangular surfaces, pentagonal surfaces, hexagonal surfaces, or quadrilateral surfaces), stepped or zigzagging surfaces, winding surfaces, irregular surfaces (e.g., non-uniform, uneven, or asymmetrical; wavy surfaces, jagged surfaces, pointed surfaces, or serrated surfaces), or any combination thereof. In certain embodiments, at least some (e.g., 2, 3, 4, 5, 6, 7, 8, 9, or 10) or all of the combustors have a common end cover (e.g., angled end cover) with a different rotational position of the end cover, e.g., each end cover may be rotated about an axis of the combustor to a different orientation relative to other end covers on other turbine combustors. However, in some embodiments, at least some (e.g., 2, 3, 4, 5, 6, 7, 8, 9, or 10) or all of the turbine combustors have different end covers, such as different angled end covers, different curved end covers, and/or flat end covers. In some embodiments, geometrical characteristics (e.g., height, width, depth, length, degree of angle, angle characteristics, radius of curvature, orientation of geometrical features, etc.) between adjacent combustor end covers may be different. Particularly, in some embodiments, adjacent combustor end covers may have any one of different geometric shapes, different geometric characteristics, different geometric arrangements, or any combination thereof.

Accordingly, the disclosed embodiments employing one or more combustors having one or more varying end covers (e.g., end covers having different geometries) helps to vary the acoustic response of the combustor, and therefore, the combustion dynamics within each combustor and among adjacent combustors, thereby mitigating the modal coupling of the combustors, which reduces the possibility of unwanted vibratory response in components downstream from the combustors. For example, providing a combustor end cover with a particular geometry (e.g., angled end cover) may provide multiple acoustic lengths, or a range of acoustic lengths, which may create a broader acoustic response within the combustor. Further, providing an adjacent combustor end cover with a different geometry (e.g., a different geometric shape, characteristic, or arrangement) may provide a different acoustic response within the combustor, and from combustor-to-combustor, reducing the possibility of in-phase and coherent behavior of the combustors of the gas turbine system.

Figure 1:
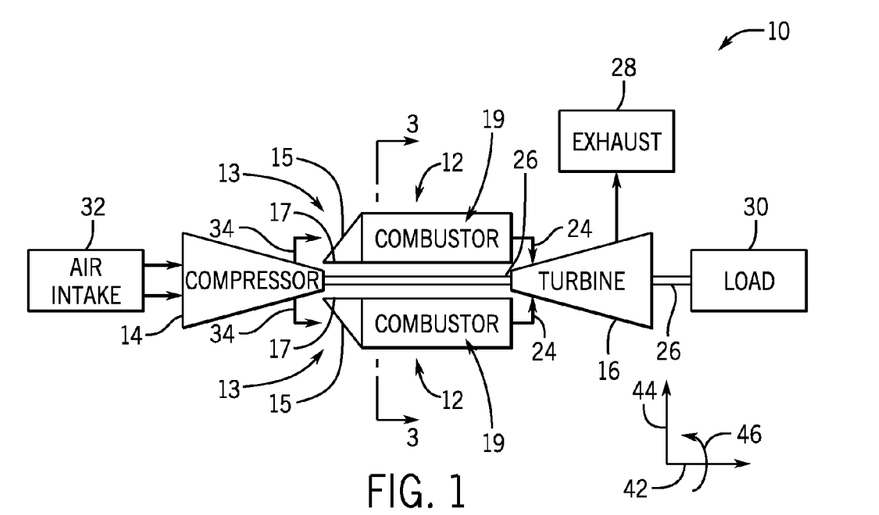
FIG. 1 is a schematic of an embodiment of a gas turbine system having a plurality of combustors with a respective plurality of end cover configurations configured to control combustion dynamics and/or modal coupling of combustion dynamics to reduce the possibility of unwanted vibratory responses in downstream components.

With the forgoing in mind, FIG. 1 is a schematic of an embodiment of a gas turbine system 10 having a plurality of combustors 12, wherein each combustor 12 is equipped with a combustor end cover 13 having a modified end cover configuration and/or geometry different from the combustor end cover 13 of an adjacent combustor 12. In other words, the end cover geometry of the combustor 12 has at least one geometrical difference relative to the end cover geometry of an adjacent combustor 12. In each combustor 12, the end cover 13 may have a modified end cover configuration (e.g., angled, curved, stepped, etc.) configured to change the acoustics and therefore the combustion dynamics in the particular combustor 12, thereby helping to reduce any unwanted vibratory responses in components downstream of the combustor 12.

For example, the modified end cover configuration may include geometrical features to change the acoustic response of the combustor (e.g., change the frequency, broaden the range of frequencies, phase shift the frequencies, or any combination), thereby helping to reduce the amplitudes of the combustion dynamics at frequencies at or near the resonant frequencies of the combustor 12 and/or components upstream or downstream from the combustor 12. In addition, the disclosed embodiments may vary the geometry of end covers 13 between the plurality of combustors 12 to help reduce or avoid any modal coupling of the combustion dynamics among the plurality of combustor 12, thereby helping to reduce any unwanted vibratory response of gas turbine components downstream of the plurality of combustors 12. For example, the disclosed embodiments may vary the geometric shape (e.g., angled, curved, stepped, concave, convex, or flat), the geometric characteristics (e.g., height, width, depth, length, degree of angle, angle characteristics, or radius of curvature), the geometric arrangements (e.g., degree of rotation between different end covers, axial position, etc.), or any combination thereof, of the end covers 13 among the plurality of combustors 12. As a result, the non-uniform geometrical configuration of end covers 13 among the combustors 12 may help to vary the combustion dynamics from one combustor to another, thereby causing changes in frequency, smearing or broadening the range of frequencies, phase shifting the frequencies, or any combination thereof, among the combustors 12. Thus, the combustion dynamics generated by the plurality of combustors 12 are less likely to result in coherent behavior that could potentially cause unwanted vibratory responses in the gas turbine system 10.

In the illustrated embodiment, the turbine system 12 has a plurality of combustors 12 each equipped with an end cover 13 (e.g., angled end cover) having an angled end wall 15 coupled to a side wall 17 (e.g., an annular side wall). These angled end covers 13 (e.g., angled end walls 15) may vary from one combustor 12 to another, such as in an angle 21 (see FIG. 2) of the angled end walls 15, a circumferential 46 orientation, or both. For example, the angled end covers 13 (particularly the angled end walls 15) may be circumferentially 46 rotated about their axes (e.g., axes 11—see FIG. 2) by an offset angle from one combustor 12 to another. The offset angle may be approximately 10, 20, 30, 40, 50, 60, 70, 80, 90, 120, 150, or 180 degrees, or any other suitable offset angle. It should be noted that the end cover 13 may be rotated relative to another end cover 13 anywhere between approximately 1 to 359 degrees. In this manner, the geometric arrangement of adjacent or non-adjacent end covers 13 may be varied, thereby reducing any undesirable vibratory responses in downstream components. In some embodiments, the geometry of the end covers 13 may be altered in geometric shape, characteristic, and/or arrangement from one combustor 12 to another. Indeed, in some embodiments, there is at least one geometrical difference between the geometries of the end covers 13 from one combustor 12 to another.

The gas turbine system 10 includes a compressor 14, one or more combustors 12 with the end covers 13, and a turbine 16. The gas turbine combustors 12 each include the end cover 13, which may be configured to direct the flow of fuel from one or more fuel sources to one or more fuel nozzles (e.g., 1, 2, 3, 4, 5, 6, or more) within the combustor 12. For example, the end cover 13 is configured to route a liquid fuel, a gas fuel, and/or a blended fuel from the fuel source and into a respective combustion chamber 19 via the fuel nozzles, as is described further in FIG. 2. The gas turbine combustors 12 ignite and combust a pressurized oxidant (e.g., air) and fuel mixture (e.g., an air-fuel mixture) within the combustion chambers 19, and then pass resulting hot pressurized combustion gases 24 (e.g., exhaust) into the turbine 16. A varied geometry of the end cover 13 may vary the inlet condition of the oxidant (e.g., compressed air) routed from the compressor 14 to the combustion chamber 19, such as, for example, a velocity of the air, a distribution of air provided to the fuel nozzles, etc. Further, varying the inlet conditions of the fuel and oxidant (e.g., air) routed to the combustion chamber 19 may vary, adjust, or change the combustion dynamics within the combustion chamber 19. Modifying the combustion dynamics, in turn, may reduce the possibility of unwanted vibratory responses in the combustor 12, upstream components, and/or downstream components. In addition, varying the geometry of adjacent end covers 13 may vary the inlet conditions of fuel and oxidant (e.g., air) routed to adjacent combustion chambers 19, and may accordingly vary the combustion dynamics among the adjacent combustors 12. The varied combustion dynamics between the plurality of combustors 12, in turn, may reduce the possibility of modal coupling between the combustors 12, and thus may further reduce the possibility of an unwanted vibratory response in the downstream components.

The upstream and downstream components may include the fuel supply system, the compressor 14, and/or the turbine 16. Turbine blades within the turbine 16 are coupled to a shaft 26 of the gas turbine system 10, which may also be coupled to several other components throughout the turbine system 10. As the combustion gases 24 flow against and between the turbine blades of the turbine 16, the turbine 16 is driven into rotation, which causes the shaft 26 to rotate. Eventually, the combustion gases 24 exit the turbine system 10 via an exhaust outlet 28. Further, in the illustrated embodiment, the shaft 26 is coupled to a load 30, which is powered via the rotation of the shaft 26. The load 30 may be any suitable device that generates power via the torque of the turbine system 10, such as an electrical generator, a propeller of an airplane, or other load.

The compressor 14 of the gas turbine system 10 includes compressor blades. The compressor blades within the compressor 14 are coupled to the shaft 26, and will rotate as the shaft 26 is driven to rotate by the turbine 16, as discussed above. As the compressor blades rotate within the compressor 14, the compressor 14 compresses air (or any suitable oxidant) received from an air intake 32 to produce pressurized air 34. The pressurized air 34 is then fed into the fuel nozzles of the combustors 12. As mentioned above, the fuel nozzles mix the pressurized air 34 and fuel to produce a suitable mixture ratio for combustion. In the following discussion, reference may be made to an axial direction or axis 42 (e.g., a longitudinal axis) of the combustor 12, a radial direction or axis 44 of the combustor 12, and a circumferential direction or axis 46 of the combustor 12.

Figure 2:
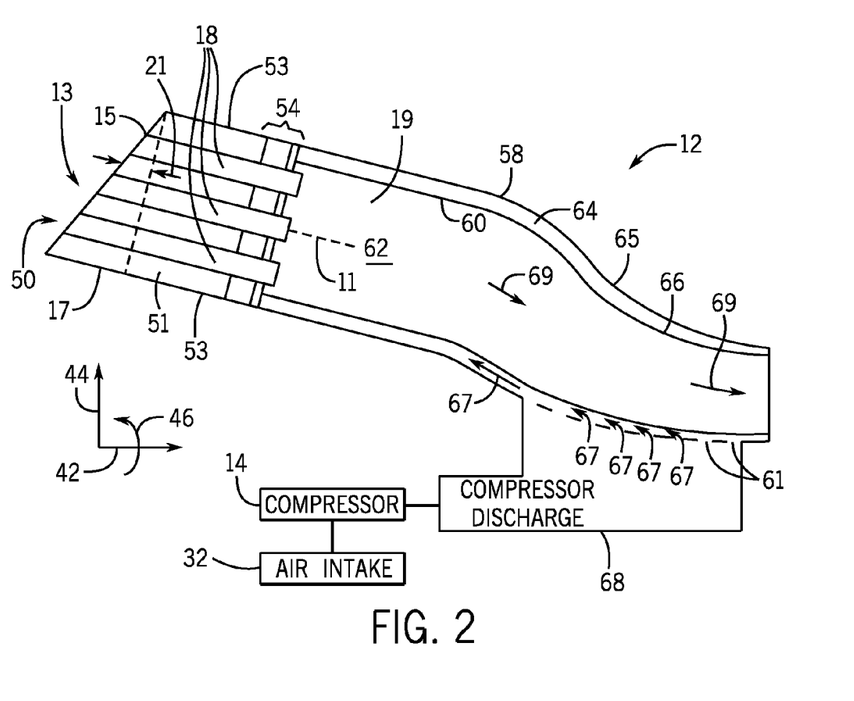
FIG. 2 is a cross-sectional schematic of an embodiment of one of the combustors of FIG. 1, wherein the combustor has an end cover with an end cover geometry (e.g., angled end cover) configured to control combustion dynamics and/or modal coupling of combustion dynamics, to reduce the possibility of unwanted vibratory responses in downstream components.

FIG. 2 is a cross-sectional view of an embodiment of one of the combustors 12 of FIG. 1, including the combustor end cover 13 with a first geometry (e.g., angled end cover 13 at an angle 21). The combustor 12 includes a head end 50, a combustor cap assembly 54, and the combustion chamber 19. The head end 50 of the combustor 12 generally encloses the cap assembly and the fuel nozzles 18 in a head end chamber 51 positioned axially between the end cover 13 and the combustion chamber 19. The combustor cap assembly 54 generally contains the fuel nozzles 18. The fuel nozzles 18 route fuel, air, and sometimes other fluids to the combustion chamber 19. The combustor 12 has one or more walls extending circumferentially 46 around the combustion chamber 19 and the axis 42 of the combustor 12, and generally represents one of a plurality of combustors 12 that are disposed in a spaced arrangement circumferentially about a rotational axis (e.g., shaft 26) of the gas turbine system 10. In certain embodiments, the geometry of the end cover 13 of at least one combustor 12 may be modified to vary acoustics and therefore, combustion dynamics in the combustor 12, or the geometries of the end covers 13 may vary between two or more (or all) of the combustors 12 to vary the acoustics and therefore the combustion dynamics among the combustors 12. For example, adjacent end covers 13 may include differences in geometric shape, geometric characteristics, and/or geometric arrangements, such that adjacent end covers 13 have at least one geometrical difference between them. Specifically, the variability in end covers 13, as discussed in detail below, helps to vary the acoustics, and therefore, the combustion dynamics in each of the plurality of combustors 12, such that the combustion dynamics frequency, range of frequencies, and/or amplitude of each combustor 12 is different from an adjacent combustor 12 within the gas turbine system 10. In addition, varying the acoustic response of the combustor, may vary the phase relationship of the combustion dynamics of two or more combustors. In this manner, the variability in end covers 13 helps to reduce unwanted vibratory responses in the gas turbine system 10, and therefore minimizes vibrational stress, wear, performance degradation of the gas turbine system 10.

In the illustrated embodiment, one or more fuel nozzles 18 are attached to the end cover 13, and pass through the combustor cap assembly 54 to the combustion chamber 19. For example, the combustor cap assembly 54 contains one or more fuel nozzles 18 (e.g., 1, 2, 3, 4, 5, 6, or more) and may provide support for each fuel nozzle 18. The combustor cap assembly 54 is disposed along a portion of the length of the fuel nozzles 18, housing the fuel nozzles 18 within the combustor 12. Each fuel nozzle 18 facilitates the mixing of pressurized air and fuel and directs the mixture through the combustor cap assembly 54 into the combustion chamber 19. The air fuel mixture may then combust in a primary combustion zone 62 of the chamber 19, thereby creating hot pressurized exhaust gases. These pressurized exhaust gases drive the rotation of blades within the turbine 16.

Each combustor 12 includes an outer wall (e.g., flow sleeve 58) disposed circumferentially about an inner wall (e.g., combustor liner 60) to define an intermediate flow passage or space 64, while the combustor liner 60 extends circumferentially about the combustion chamber 19. The inner wall 60 also may include a transition piece 66, which generally converges toward a first stage of the turbine 16. The impingement sleeve 65 is disposed circumferentially about the transition piece 66. The liner 60 defines an inner surface of the combustor 12, directly facing and exposed to the combustion chamber 19. The flow sleeve 58 and impingement sleeve 65 include a plurality of perforations 61, which direct an airflow 67 from a compressor discharge 68 into the flow passage 64 while also impinging air against the liner 60 and the transition piece 66 for purposes of impingement cooling. The flow passage 64 then directs the airflow 67 in an upstream direction toward the head end 50 (e.g., relative to a downstream direction 69 of the hot combustion gases), such that the airflow 67 further cools the liner 60 before flowing through the head end chamber 51, through the fuel nozzles 18, and into the combustion chamber 19.

The end cover 13 may have a particular geometry, such as a geometric shape, characteristic, or arrangement, which may be configured to vary the acoustic response of the combustor and therefore the combustion dynamics (e.g., pressure pulsations, fluctuations, or oscillations) within the combustor 12. For example, the head end chamber 51 is defined or bounded by the end cover 13, the combustor cap assembly 54 axially 42 offset from the end cover 13, and a wall 53 extending circumferentially 46 around the chamber 51. A geometrical change to the end cover 13 may change a portion of this boundary of the head end chamber 51 and/or a volume of the head end chamber 51, thereby altering the acoustic characteristics of the head end chamber 51, and thus altering the acoustic response of the combustor and therefore the combustion dynamics of the combustor 12. For example, a modified end cover 13 may result in varying the frequency, amplitude, or the relative phase of the combustion dynamics of one combustor with respect to another, or any combination thereof. In certain embodiments, the end cover 13 may be modified in a manner to tune the combustor 12 to operate at a certain frequency or within a certain frequency range. In multi-combustor 12 gas turbine systems 10, each combustor 12 may be equipped with a modified end cover 13 that tunes the combustor 12 to operate at a certain frequency and/or frequency range. For example, the combustors 12 may be equipped with modified end covers 13 that alternate combustion dynamics frequency from combustor to combustor, gradually step up or step down the combustion dynamics frequency or randomly distribute the combustion dynamics frequency among the plurality of combustors 12.

In the illustrated embodiment, the end cover 13 (e.g., angled end cover) has an angle 21 relative to the radial direction 44 (e.g., a plane of the combustor cap assembly 54). The angle 21 may be approximately 1 to 60, 2 to 45, 3 to 30, 4 to 20, or 5 to 15 degrees. In some embodiments, the angle 21 may be the same in all of the combustors 12, while one or more (or all) of the end covers 13 are rotated circumferentially 46 about their axes (e.g., axes 11 of the combustors 12) to alter the orientation of the end covers 13 relative to the fuel nozzles 18, combustion chamber 19, and shaft 26 of the gas turbine system 10. In other embodiments, the combustors 12 may include 2, 3, 4, 5, 6, 7, 8, 9, 10, or more different angles 21 for the end covers 13, and one or more (or all) of the end covers 13 may be rotated circumferentially 46 about their axes (e.g., axes 11 of the combustors 12) to alter the orientation of the end cover 13 relative to the fuel nozzles 18, combustion chamber 19, and shaft 26 of the gas turbine system 10.

The end cover 13 may generally be configured to route a liquid fuel, a gas fuel, and/or a blended fuel from the fuel source and into the combustion chamber 19 via one or more of the fuel nozzles 18. The gas turbine combustor 12 ignites and combusts the pressurized air and fuel mixture (e.g., an air-fuel mixture) within the combustion chamber 19, and then passes resulting hot pressurized combustion gases 24 (e.g., exhaust) into the turbine 16 in the downstream direction 69. In certain embodiments, varying the geometry of the end cover 13 may vary the inlet conditions of the air and fuel being supplied through the head end 50 into the combustion chamber 19 and may vary, adjust, or change the acoustic response of the combustor and therefore, the combustion dynamics of the combustor 12 to reduce unwanted vibratory responses in the gas turbine system 10.

Figure 3:
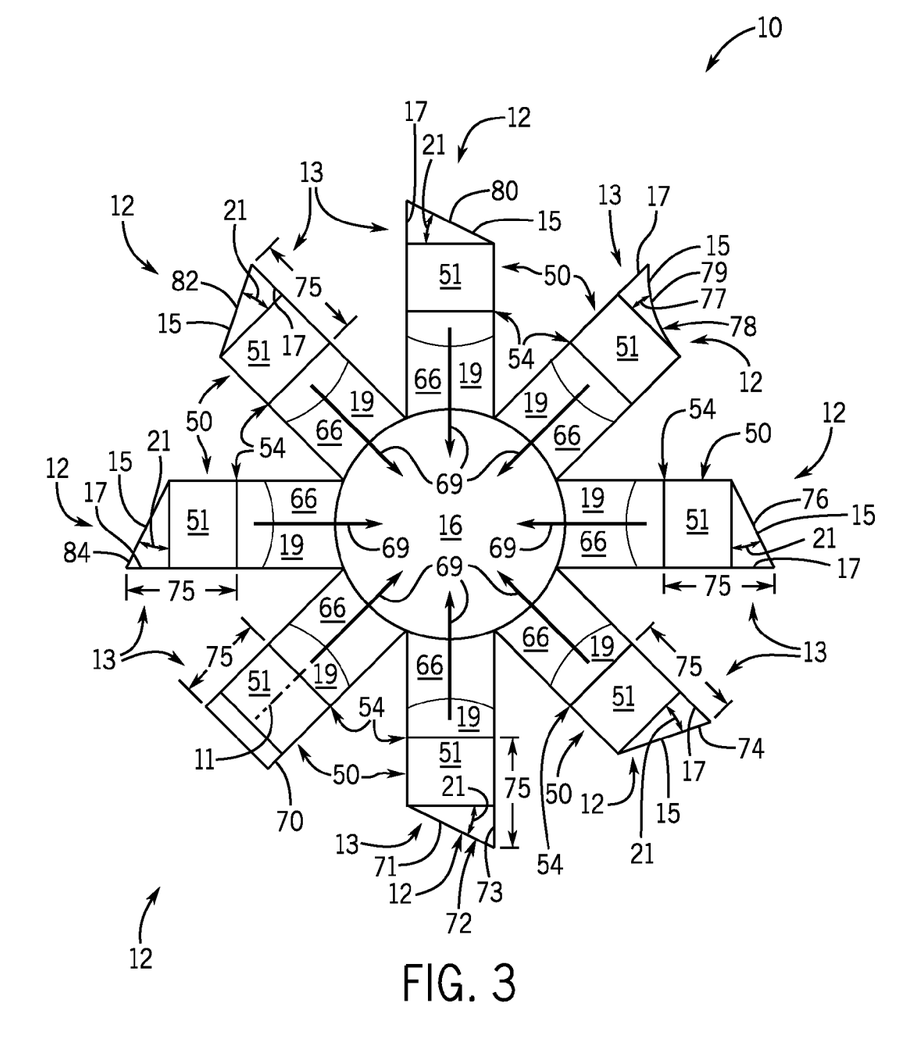
FIG. 3 is a cross-sectional schematic of an embodiment of the gas turbine system of FIG. 1, taken along line 3-3, illustrating a plurality of combustors with a respective plurality of end cover configurations (e.g., end cover geometries) configured to control combustion dynamics and/or modal coupling of combustion dynamics, to reduce the possibility of unwanted vibratory responses in downstream components.

FIG. 3 is a cross-sectional schematic of an embodiment of the gas turbine system 10 of FIG. 1, taken along line 3-3, illustrating a plurality of combustors 12 each equipped with modified end covers 13 that vary from one combustor 12 to another to vary the acoustics and therefore, combustion dynamics, between the combustors 12 of the system 10 to reduce the combustion dynamics amplitude and/or modal coupling of the combustion dynamics among the combustors 10. For example, the end cover geometry from one combustor 12 to another may have at least one geometrical difference. It should be noted that any number of combustors 12 (e.g., 0, 1, 2, 3, 4, 5, or more) may include modified end covers 13, such that at least one of the combustors 12 with the modified end cover 13 produces an acoustic response different from the acoustic response of the combustors 12 without the modified end cover 13. Accordingly, while the following description utilizes variation between adjacent combustors 12 as an illustrative embodiment, it should be noted that any individual combustor 12 may be utilized to produce its own unique acoustic response that is different from the other combustors 12. Further, multiple groups of combustors 12 with the modified end covers 13, with or without a particular spatial arrangement (e.g., adjacent or alternating) may be utilized to produce a unique acoustic response, thereby reducing modal coupling between the combustors 12.

In some embodiments, the system 10 may include one or more groups (e.g., 1, 2, 3, 4, 5, or more) of combustors 12, where each group of combustors 12 includes one or more combustors 12 (e.g., 1, 2, 3, 4, 5, or more). In some situations, each group of combustors 12 may include identical combustors 12 that differ from one or more other groups of combustors 12 within the system 10. For example, a first group of combustors 12 may include identical combustors 12 having a first end cover 13 geometry, and a second group of combustors 12 may include identical combustors 12 have a second end cover geometry. Further, the first end cover 13 geometry may be different from the second end cover 13 geometry in one or more ways. Accordingly, the first group of combustors 12 may produce an acoustic response that is different from the acoustic response of the second group of combustors 12 within the system 10, as further explained below.

The illustrated embodiment depicts how the geometry of multiple end covers 13 can vary in geometric characteristics, geometric arrangements, and/or geometric shapes circumferentially 46 around the gas turbine system 10. For example, the plurality of end covers 13 may have different geometric characteristics, such as differences in dimensions (e.g., height, width, length, depth, etc.), angles 21 (e.g., degree of angle and/or slope of the end cover 13), and so forth. Further, the end covers 13 may have different geometric arrangements, such as differences in rotational orientations (e.g., degree of rotation of the end cover 13 about its axis relative to an adjacent end cover 13), and so forth. In addition, the end covers 13 may have different geometric shapes, such as end covers 13 that are angled, concaved, convexed, concavely angled, convexly angled, shaped similar to various polygons (e.g., triangle, quadrilateral, pentagon, hexagon, etc.), irregularly shaped (e.g., waved, jagged, uneven, pointed, serrated, etc.), irregularly angled, or any combination thereof.

In the illustrated embodiment, the gas turbine system 10 includes eight combustors 12 coupled to the turbine 16. However, in other embodiments, the gas turbine system 10 includes any number of combustors 12 (e.g., 1, 2, 3, 4, 5, 6, 7, 8, 9, 10, 11, 12, 13, 14, 15, 16, or more combustors) or any number of groups of combustors 12 (e.g., 1, 2, 3, 4, 5, or more). In particular, each combustor 12 has a head end chamber 51 partially bounded by the end cover 13, which may have a geometry (e.g., geometric characteristics, shapes, and/or arrangements) that is modified and/or different than the geometry of the end cover 13 of another combustor 12, such that there is at least one geometrical difference between the combustors 12. The end cover 13 may be configured to route a fuel from the fuel source to the one or more fuel nozzles 18. The fuel nozzles 18, in turn, route the fuel to the combustion chamber 19 of the combustor 12, mixing it with the oxidant, so that the air-fuel mixture can combust within the combustion chamber 19 and the resultant combustion gases can flow through the transition piece 66 in a downstream flow direction 69 (e.g., into the turbine 16). As described above, the geometry of the end cover 13 may vary, adjust, or change the acoustic response, and thereby the combustion dynamics, within the combustion chamber 19. Modifying the combustion dynamics, in turn, may reduce the possibility of unwanted vibratory responses in the combustor 12, upstream components, and/or downstream components.

The illustrated schematic of the gas turbine system 10 depicts variability between the end covers 13 of adjacent and non-adjacent combustors 12. For example, relative to a baseline end cover 70 (e.g., flat end cover without variations in geometry), an adjacent end cover 72 on the adjacent combustor 12 (or the end cover 72 on any combustor 12 within the system 10) may be modified with different geometric features, such as differences in geometric shape and/or geometric characteristics. For example, relative to the baseline end cover 70 having a flat shape (e.g., a flat circular plate) that is perpendicular to the axis 11 of the combustor 12, the end cover 72 is an angled end cover having a triangular configuration. The angled end cover 72 may include an angled end wall 15 (e.g., 71) coupled to a cylindrical side wall 17 (e.g., 73), thereby defining a generally triangular cross-section. The angled end cover 72 defines a variable axial length 75 of the head end chamber 51 between the angled end wall 71 and the cap assembly 54, rather than a constant axial length 75 as provided by the baseline end cover 70. In the illustrated embodiment, the angled end wall 71 of the end cover 72 may vary the axial length 75 of the head end chamber 51 by approximately 1 to 50, 2 to 40, 3 to 30, 4 to 20, or 5 to 15 percent depending on various dimensions of the combustor 12. The angled end wall 71 of the end cover 72 also may have an angle 21, such as a constant angle, that is approximately 1 to 60, 2 to 40, 3 to 30, or 4 to 15 degrees. The angle 21 also varies the range of axial lengths 75. Together, the angle 21 and variable axial lengths 75 of the angled end cover 72 help to vary the acoustic response of the combustor 12, and therefore the combustion dynamics, in the combustion chamber 19 of the combustor 12. For example, the angled end cover 72 may result in frequencies that are different, phase shifted, smeared or spread out over a greater frequency range in the combustor 12. These frequencies may be adjusted or tuned for each combustor 12 by varying the angle 21, associated axial lengths 75, and orientation of the angle 21 (e.g., circumferential 46 orientation about the axis 11).

In some embodiments, adjacent and non-adjacent end covers 13 (e.g., an angled end cover 74 and an angled end cover 76) may have different geometric arrangements. For example, the angled end cover 74 may have a variable axial length 75 and an angle 21, while the angled end cover 76 may have a variable axial length and an angle 21. In some embodiments, the lengths 75 and the angles 21 between adjacent combustors 12 may be substantially the same or equal, while the angled end covers 74 and 76 (e.g., the angled end walls 15) may be rotated circumferentially 46 about their axes 11 to alter the angular orientation of the lengths 75 and the angles 21 within each respective combustor 12. The illustrated end covers 74 and 76 are rotated approximately 180 degrees, while other embodiments may provide a rotational offset of approximately 5, 10, 15, 20, 25, 30, 45, 60, 75, 90, 120, 150, or 180 degrees. Indeed, rotating the angled end covers 13 (e.g., the angled end cover 74 and the angled end cover 76) may vary the acoustics in the adjacent combustors 12, such that the combustion dynamics frequency, range of frequencies, and/or amplitude of each combustor 12 is different, thereby reducing the possibility of modal coupling of the combustors 12, particularly at frequencies that are aligned with resonant frequencies of the components of the gas turbine system 10. Indeed, in such embodiments, the combustors 12 of the system may have substantially the same performance and operational characteristics, but may generate different acoustics and/or combustion dynamics. For example, in certain embodiments, the combustors 12 may be identical with the exception of the end covers 13. In short, varying the geometric arrangement (e.g., rotation) of any combustor end cover 13 within the system 10 may provide acoustic and/or combustion dynamics differences between that combustor 12 and the other combustors 12 within the system 10, but may retain the performance and design functionalities of the adjacent combustors 12.

In some embodiments, two or more end covers 13 (e.g., a curved end cover 78 and an angled end cover 80) may have different geometric shapes. For example, the curved end cover 78 may have a side wall 17 coupled to an angled end wall 15 that is at least partially curved to define a variable angle 21 (e.g., 77), such as a concave end wall portion 79. In contrast, the angled end cover 80 has a side wall 17 coupled to an angled end wall 15 that defines a constant angle 21. The variable angle 77 of the curved end cover 78 and the constant angle 21 of the angled end cover 80 may result in different acoustic responses in the two combustors 12, thereby helping reduce the possibility of modal coupling between the combustors 12.

As noted above, the system 10 may include one or more groups of combustors 12, where each group of combustors 12 includes one or more combustors 12. In some embodiments, the combustors 12 within each group may be modified together such that the group of combustors 12 produces an acoustic response that is different from the acoustic response of one or more other groups of the system 10, such that each group of combustors 12 may produce a unique acoustic response. Accordingly, it may not be necessary for each individual combustor 12 within the system 10 to produce its own unique acoustic response in order to help reduce coherence and modal coupling. Rather, the combustors 12 may be modified together within one or more groups such that each group of combustors 12 produces an acoustic response that is different from the acoustic response of one or more other groups of combustors 12 within the system 10.

For example, a first group of combustors 12 may include identical combustors 12 having a first end cover 13 geometry, a second group of combustors 12 may include identical combustors 12 having a second end cover geometry, and a third group of combustors 12 may include identical combustors 12 having a third end cover 13 geometry. Further, the end cover 13 geometries of each group of combustors may be different from each other in one or more ways, as described below with respect to FIGS. 4-11. Accordingly, the first group of combustors 12 may be adjusted and/or tuned (e.g., baseline configuration) to achieve a first acoustic response, the second group of the combustors 12 may be adjusted and/or tuned to a configuration different from the baseline configuration to achieve a second acoustic response, and the third group of the combustors 12 may be adjusted and/or tuned different from the baseline configuration to achieve a third acoustic response. The first, second, and third acoustic responses may be different from one another. As a result, the acoustic responses associated with the combustors 12 cannot coherently or constructively interfere with one another, reducing modal coupling and, therefore, the ability of the combustion system to drive sympathetic vibrations in the downstream components of the system 10. Though three groups and three frequencies are described, it should be clear that any number of groups and/or frequencies may be employed.

It should be noted that the end covers 13 may be formed with any shape, as is described in detail with respect to FIGS. 4-11. In some embodiments, adjacent end covers 13 (e.g., angled end cover 82 and angled end cover 84) may have different geometric characteristics, such as, for example, differences in angles 21, axial lengths 75, curvatures, surface textures, variations along the surfaces, or any combination thereof. For example, the angle 21 of the angled end cover 82 may be lesser than the angle 21 of the angled end cover 84, e.g., approximately 1 to 60, 2 to 40, 3 to 30, 4 to 15, or 5 to 10 degrees difference. Likewise, the angled end cover 82 may define a variable axial length 75 of the head end chamber 51, while the angled end cover 84 may define a variable axial length 75 of head end chamber 51. In the illustrated embodiment, due to the difference in angles 21, the variable axial length 75 has a smaller range or variation than the variable axial length 75 within the adjacent combustor 12. As described above, the variable geometric characteristics between end covers 13, such as the angles 21 and axial lengths 75, may result in variations among the combustors 12 in acoustic response, and therefore, combustion dynamics frequencies. In this manner, the variability in end covers 13 helps to reduce modal coupling of the combustors 12 in the system 10, and minimizes vibrational stress, wearing, performance degradation, or other undesirable interactions between the components of the system 10 (e.g., turbine blades, turbine shrouds, turbine nozzles, etc.).

FIGS. 4-11 are cross-sectional schematics of combustors 12 having various embodiments of combustor end covers 13 with different shapes, orientations, or configurations to control acoustics and/or combustion dynamics. For example, each of the end covers 13 may have a variety of angled portions, curved portions, flat portions, stepped portions, textured portions, smooth portions, protrusions, recesses, or any combination thereof. The angled portions may include one or more constant angles, which are the same or different from one another. The curved portions may include one or more convex portions, concave portions, wave shaped portions, or any combination thereof. Together, the various shapes may define a cross-section of the end cover 13, such as a polygonal cross-section (e.g., triangle, quadrilateral, pentagon, hexagon, etc.). The end covers 13 also may have one or more irregularly shaped portions (e.g., irregular angles, curves, or waves; jagged portions, uneven portions, pointed portions, serrated portions, etc.), or any combination thereof. The end covers 13 also may have converging wall portions, diverging wall portions, or both. All of these shapes, orientations, and configurations may help to vary the acoustic responses of the combustor 12 within the system 10. As noted above, the end cover 13 geometries of the combustors 12 within each group of combustors 12 may be different from the end cover 13 geometry of the combustors 12 within a particular group of combustors 12 having a baseline configuration. Accordingly, each group of combustors 12 may include a particular end cover 13 geometry that is different in shape, orientation or configuration from another group within the system 10.

Figure 4:
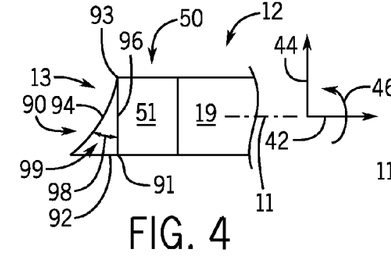
FIG. 4 is a cross-sectional schematic of an embodiment of a combustor having an end cover with an asymmetrical curved configuration (e.g., asymmetrical inwardly curved end wall) configured to control combustion dynamics and/or modal coupling of combustion dynamics, to reduce the possibility of unwanted vibratory responses in downstream components.

FIG. 4 is a cross-sectional schematic of a combustor 12, illustrating an embodiment of a modified end cover 13 with an asymmetrical curved configuration 90 relative to the axis 11. In certain embodiments, the asymmetrical curved configuration 90 of the modified end cover 13 may be rotated about the axis 11 to vary the acoustics and/or combustion dynamics of the combustor 12. When used in multiple combustors 12, the asymmetrical curved configuration 90 of each modified end cover 13 may be rotated about the axis 11 of one or more combustors 12 or groups of combustors 12 (i.e., different rotational orientation in one or more combustor 12 or group of combustors 12) to vary help to vary the acoustic responses of the combustor 12 from at least one other combustor 12 within the system.

In the illustrated embodiment, the asymmetrical curved configuration 90 of the modified end cover 13 includes an asymmetrical side wall 92, an asymmetrical inwardly curved end wall 94, and an open mounting interface 96. For example, the asymmetrical side wall 92 may be an annular side wall that gradually decreases in axial length from a first side 91 to an opposite second side 93 (i.e., diametrically opposite sides 91, 93 relative to axis 11). The illustrated asymmetrical side wall 92 has a maximum axial height on the first side 91 and a minimum axial height on the opposite second side 93. The asymmetrical inwardly curved end wall 94 curves inwardly toward the open mounting interface 96 (and the head end chamber 51) from the first side 91 to the second side 93, such that the end wall 94 defines a concave wall portion or concave end wall. The inwardly curved end wall 94 has an angle 98 relative to the open mounting interface 96, wherein the angle 98 may be continuously or incrementally variable (e.g., decreasing) from the first side 91 to the second side 93. The illustrated side wall 92 is perpendicular to the open mounting interface 96, but may be acutely angled relative to the interface 96 in other embodiments. The open mounting interface 96 may include an annular mounting flange surrounding a generally circular opening in fluid communication with the head end chamber 51, such that the asymmetrical curved configuration 90 of the modified end cover 13 defines an asymmetrical chamber or volume 99 adjacent the head end chamber 51 (e.g., collectively defining an asymmetrical head end chamber 51, 99). The radius of curvature and/or angle 98 of the inwardly curved end wall 94 may be varied to control the acoustics and/or combustion dynamics of the combustor 12. The rotational orientation (e.g., about the axis 11) of the asymmetrical curved configuration 90 of the modified end cover 13 also may be adjusted to control the acoustics and/or combustion dynamics of the combustor 12. For example, the asymmetrical curved configuration 90 may be rotated about the axis 11 by any increment of approximately 5, 10, 15, 20, 25, 30, 35, 40, 45, 50, 55, 60, 65, 70, 75, 80, 95, 90, 120, 150, or 180 degrees from one combustor 12 to another. In certain embodiments, the incremental degree of rotation may be defined by a circumferential 46 pattern or spacing of bolt holes in the open mounting interface 96, such as a number of equally spaced bolt holes in a mounting flange.

Thus, the same end cover 12 with the asymmetrical curved configuration 90 may be used for all of the combustors 12, while still enabling variations in the acoustic responses, and thereby the combustion dynamics, from one combustor 12 to another. In this manner, the asymmetrical curved configuration 90 may help to reduce the possibility of modal coupling between combustors 12 of the system.

Figure 5:
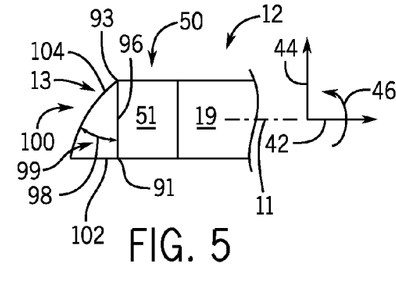
FIG. 5 is a cross-sectional schematic of an embodiment of a combustor having an end cover with an asymmetrical curved configuration (e.g., asymmetrical outwardly curved end wall) configured to control combustion dynamics and/or modal coupling of combustion dynamics, to reduce the possibility of unwanted vibratory responses in downstream components.

FIG. 5 is a cross-sectional schematic of a combustor 12, illustrating an embodiment of a modified end cover 13 with an asymmetrical curved configuration 100 relative to the axis 11. In certain embodiments, the asymmetrical curved configuration 100 of the modified end cover 13 may be rotated about the axis 11 to vary the acoustics and/or combustion dynamics of the combustor 12. When used in multiple combustors 12, the asymmetrical curved configuration 100 of each modified end cover 13 may be rotated about the axis 11 of each combustor 12 (i.e., different rotational orientation in each combustor 12) to help to vary the acoustic responses of the combustor 12 from at least one other combustor 12 within the system.

In the illustrated embodiment, the asymmetrical curved configuration 100 of the modified end cover 13 includes an asymmetrical side wall 102, an asymmetrical outwardly curved end wall 104, and an open mounting interface 96. For example, the asymmetrical side wall 102 may be an annular side wall that gradually decreases in axial length from a first side 91 to an opposite second side 93 (i.e., diametrically opposite sides 91, 93 relative to axis 11). The illustrated asymmetrical side wall 102 has a maximum axial height on the first side 91 and a minimum axial height on the opposite second side 93. The asymmetrical outwardly curved end wall 104 curves outwardly away from the open mounting interface 96 (and the head end chamber 51) from the first side 91 to the second side 93, such that the end wall 104 defines a convex wall portion or convex end wall. The outwardly curved end wall 104 has an angle 98 relative to the open mounting interface 96, wherein the angle 98 may be continuously or incrementally variable (e.g., increasing) from the first side 91 to the second side 93. The illustrated side wall 102 is perpendicular to the open mounting interface 96, but may be acutely angled relative to the interface 96 in other embodiments. The open mounting interface 96 may include an annular mounting flange surrounding a generally circular opening in fluid communication with the head end chamber 51, such that the asymmetrical curved configuration 100 of the modified end cover 13 defines an asymmetrical chamber or volume 99 adjacent the head end chamber 51 (e.g., collectively defining an asymmetrical head end chamber 51, 99). The radius of curvature and/or angle 98 of the outwardly curved end wall 104 may be varied to control the acoustics and/or combustion dynamics of the combustor 12. The rotational orientation (e.g., about the axis 11) of the asymmetrical curved configuration 100 of the modified end cover 13 also may be adjusted to control the acoustics and/or combustion dynamics of the combustor 12. For example, the asymmetrical curved configuration 100 may be rotated about the axis 11 by any increment of approximately 5, 10, 15, 20, 25, 30, 35, 40, 45, 50, 55, 60, 65, 70, 75, 80, 95, 90, 120, 150, or 180 degrees from one combustor 12 to another. In certain embodiments, the incremental degree of rotation may be defined by a circumferential 46 pattern or spacing of bolt holes in the open mounting interface 96, such as a number of equally spaced bolt holes in a mounting flange.

Thus, the same end cover 12 with the asymmetrical curved configuration 100 may be used for all of the combustors 12, while still enabling variations in the acoustic responses, and thereby the combustion dynamics, from one combustor 12 to another. In this manner, the asymmetrical curved configuration 100 may help to reduce the possibility of modal coupling between combustors 12 of the system.

Figure 6:
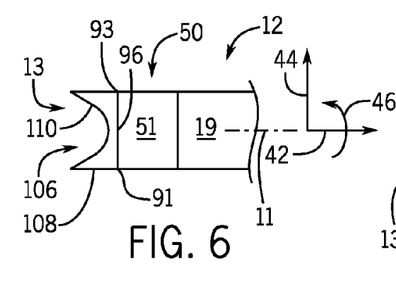
FIG. 6 is a cross-sectional schematic of an embodiment of a combustor having an end cover with a centrally curved configuration (e.g., symmetrical inwardly curved end wall) configured to control combustion dynamics and/or modal coupling of combustion dynamics, to reduce the possibility of unwanted vibratory responses in downstream components.

FIG. 6 is a cross-sectional schematic of a combustor 12, illustrating an embodiment of a modified end cover 13 with a centrally curved configuration 106. In certain embodiments, the centrally curved configuration 106 of the modified end cover 13 may be asymmetrical relative to the axis 11, and the configuration 106 may be rotated about the axis 11 to help to vary the acoustic responses of the combustor 12 from at least one other combustor 12 within the system.

In the illustrated embodiment, the centrally curved configuration 106 of the modified end cover 13 is a symmetrical configuration, which includes a symmetrical side wall 108, a symmetrical inwardly curved end wall 110, and an open mounting interface 96. For example, the symmetrical side wall 108 may be an annular side wall that has a constant axial length from a first side 91 to an opposite second side 93 (i.e., diametrically opposite sides 91, 93 relative to axis 11). The symmetrical inwardly curved end wall 110 curves inwardly toward the open mounting interface 96 (and the head end chamber 51) from both the first and second sides 91 and 93, such that the end wall 110 defines a symmetrical concave wall portion or symmetrical concave end wall. The radius of curvature and/or angle of the inwardly curved end wall 110 may be varied to control the acoustics and/or combustion dynamics of the combustor 12. In certain embodiments, a plurality of end covers 13 having the centrally curved configuration 106 may be used in the gas turbine system 10, wherein each configuration 106 has a different radius of curvature and/or angle of the inwardly curved end wall 110.

In this manner, the centrally curved configuration 106 may enable variations in the acoustic responses, and thereby the combustion dynamics, from one combustor 12 to another. In this manner, the centrally curved configuration 106 may help to reduce the possibility of modal coupling between combustors 12 of the system.

Figure 7:
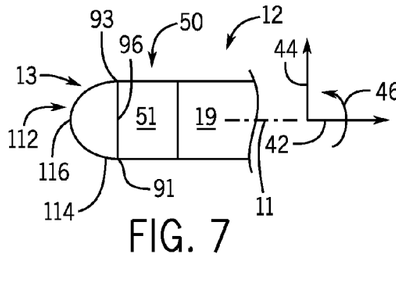
FIG. 7 is a cross-sectional schematic of an embodiment of a combustor having an end cover with a centrally curved configuration (e.g., symmetrical outwardly curved end wall) configured to control combustion dynamics and/or modal coupling of combustion dynamics, to reduce the possibility of unwanted vibratory responses in downstream components.

FIG. 7 is a cross-sectional schematic of a combustor 12, illustrating an embodiment of a modified end cover 13 with a centrally curved configuration 112. In certain embodiments, the centrally curved configuration 112 of the modified end cover 13 may be asymmetrical relative to the axis 11, and the configuration 112 may be rotated about the axis 11 to vary the acoustics and/or combustion dynamics of the combustor 12 from another combustor 12 within the system 10.

In the illustrated embodiment, the centrally curved configuration 112 of the modified end cover 13 is a symmetrical configuration, which includes a symmetrical side wall 114, a symmetrical outwardly curved end wall 116, and an open mounting interface 96. For example, the symmetrical side wall 114 may be an annular side wall that has a constant axial length from a first side 91 to an opposite second side 93 (i.e., diametrically opposite sides 91, 93 relative to axis 11). The symmetrical outwardly curved end wall 116 curves outwardly away from the open mounting interface 96 (and the head end chamber 51) from both the first and second sides 91 and 93, such that the end wall 116 defines a symmetrical convex wall portion or symmetrical convex end wall. The radius of curvature and/or angle of the outwardly curved end wall 116 may be varied to control the acoustics and/or combustion dynamics of the combustor 12. In certain embodiments, a plurality of end covers 13 having the centrally curved configuration 112 may be used in the gas turbine system 10, wherein each configuration 112 has a different radius of curvature and/or angle of the outwardly curved end wall 116.

In this manner, the centrally curved configuration 112 may enable variations in the acoustic responses, and thereby the combustion dynamics, from one combustor 12 to another. Further, the centrally curved configuration 112 may help to reduce the possibility of modal coupling between combustors 12 of the system.

Figure 8:
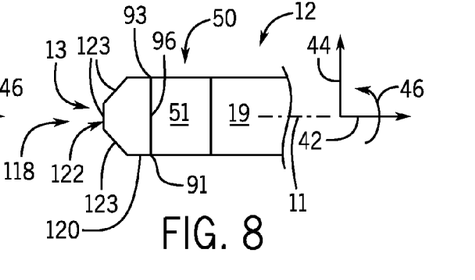
FIG. 8 is a cross-sectional schematic of an embodiment of a combustor having an end cover with a multi-angled configuration (e.g., multi-angled end wall) configured to control combustion dynamics and/or modal coupling of combustion dynamics, to reduce the possibility of unwanted vibratory responses in downstream components.

FIG. 8 is a cross-sectional schematic of a combustor 12, illustrating an embodiment of a modified end cover 13 with a multi-angled configuration 118. In certain embodiments, the multi-angled configuration 118 of the modified end cover 13 may be asymmetrical relative to the axis 11, and the configuration 118 may be rotated about the axis 11 to vary the acoustics and/or combustion dynamics of an individual combustor 12 or from one combustor 12 to another. In the other embodiments, the multi-angled configuration 118 of the modified end cover 13 may be asymmetrical relative to the axis 11, yet the multi-angled configuration 118 may be varied (e.g., altering angles, number of sides, length of sides, etc.) to help vary the acoustics and/or combustion dynamics of the combustor 12 from another combustor 12 within the system 10.

In the illustrated embodiment, the multi-angled configuration 118 has a side wall 120, a multi-angled end wall 122, and an open mounting interface 96. The side wall 120 may be an annular side wall that has either a variable or constant axial length from a first side 91 to an opposite second side 93 (i.e., diametrically opposite sides 91, 93 relative to axis 11). The multi-angled end wall 122 may include a plurality of angled wall portions 123 (e.g., three angled wall portions), each having an angle relative to the axis 11 or the interface 96. For example, a central angled wall portion 123 may be perpendicular to the axis 11 (or parallel to the interface 96), while the peripheral angled wall portions 123 may be acutely angled relative to the axis 11 and the interface 96. In certain embodiments, the peripheral angled wall portions 123 define a generally conical or tapered annular wall portion, which may have a constant or variable angle around the axis 11. In other embodiments, the peripheral angled wall portions 123 may include a plurality of flat tapered wall portions (e.g., 2, 3, 4, 5, 6, 7, 8, 9, 10, or more) spaced circumferentially 46 about the axis 11. Collectively, the plurality of angled wall portions 123, the side wall 120, and the interface 96 define a polygonal cross-section, such as a hexagonal cross-section.

The length and/or angle of each of the plurality of angled wall portions 123 and the side wall 120 may be varied in each combustor 12 and/or from one combustor 12 to another. In this manner, the multi-angled configuration 118 may help to may vary acoustic responses, and thereby the combustion dynamics, from one combustor 12 to another. Further, the multi-angled configuration 118 may help to reduce the possibility of modal coupling between combustors 12 of the system.

Figure 9:
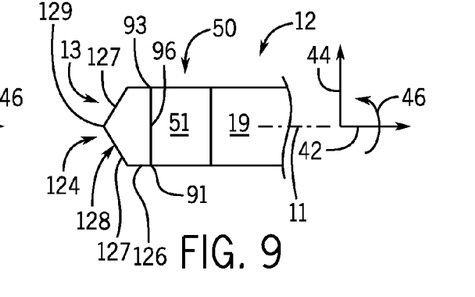
FIG. 9 is a cross-sectional schematic of an embodiment of a combustor having an end cover with a multi-angled configuration (e.g., multi-angled end wall) configured to control combustion dynamics and/or modal coupling of combustion dynamics, to reduce the possibility of unwanted vibratory responses in downstream components.

FIG. 9 is a cross-sectional schematic of a combustor 12, illustrating an embodiment of a modified end cover 13 with a multi-angled configuration 124. In certain embodiments, the multi-angled configuration 124 of the modified end cover 13 may be asymmetrical relative to the axis 11, and the configuration 124 may be rotated about the axis 11 to vary the acoustics and/or combustion dynamics of an individual combustor 12 or from one combustor 12 to another. In the other embodiments, the multi-angled configuration 124 of the modified end cover 13 may be asymmetrical relative to the axis 11, yet the multi-angled configuration 124 may be varied (e.g., altering angles, number of sides, length of sides, etc.) to help vary the acoustics and/or combustion dynamics of the combustor 12 from another combustor 12 within the system 10.

In the illustrated embodiment, the multi-angled configuration 124 has a side wall 126, a multi-angled end wall 128, and an open mounting interface 96. The side wall 126 may be an annular side wall that has either a variable or constant axial length from a first side 91 to an opposite second side 93 (i.e., diametrically opposite sides 91, 93 relative to axis 11). The multi-angled end wall 128 may include a plurality of angled wall portions 127 (e.g., two angled wall portions), each having an angle relative to the axis 11 or the interface 96. For example, adjacent angled wall portions 127 may be acutely angled relative to the axis 11 and the interface 96, and the wall portions 127 may extend to an apex 129. The angled wall portions 127 also may be described as converging wall portions (e.g., converging to the apex 129) or diverging wall portions (e.g., diverging from the apex 129). The apex 129 may be centered along the axis 11, or the apex 129 may be offset from the axis 11 to define an asymmetrical configuration of the wall portions 127. In certain embodiments, the adjacent wall portions 127 define a generally conical or tapered annular wall portion, which may have a constant or variable angle around the axis 11. In other embodiments, the peripheral angled wall portions 127 may include a plurality of flat tapered wall portions (e.g., 2, 3, 4, 5, 6, 7, 8, 9, 10, or more) spaced circumferentially 46 about the axis 11. Collectively, the plurality of angled wall portions 127, the side wall 126, and the interface 96 define a polygonal cross-section, such as a pentagonal cross-section.

The length and/or angle of each of the plurality of angled wall portions 127 and the side wall 126 may be varied in each combustor 12 and/or from one combustor 12 to another. In this manner, the multi-angled configuration 124 may help to vary acoustic responses, and thereby the combustion dynamics, from one combustor 12 to another. Further, the multi-angled configuration 124 may help to reduce the possibility of modal coupling between combustors 12 of the system.

Figure 10:
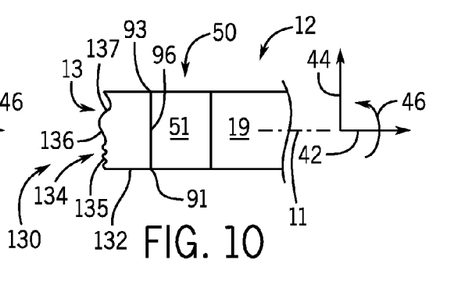
FIG. 10 is a cross-sectional schematic of an embodiment of a combustor having an end cover with an asymmetrical irregular configuration (e.g., asymmetrical irregular end wall) configured to control combustion dynamics and/or modal coupling of combustion dynamics, to reduce the possibility of unwanted vibratory responses in downstream components.

FIG. 10 is a cross-sectional schematic of a combustor 12, illustrating an embodiment of a modified end cover 13 with an asymmetrical irregular configuration 130. In the illustrated embodiment, the asymmetrical irregular configuration 130 of the modified end cover 13 may be rotated about the axis 11 to vary the acoustics and/or combustion dynamics of an individual combustor 12 or from one combustor 12 to another. In other embodiments, the irregular configuration 130 of the modified end cover 13 may be symmetrical relative to the axis 11, yet the irregular configuration 130 may be varied (e.g., altering characteristics of turns, steps, curves, angles, lengths, recesses, protrusions, etc.) to help vary the acoustics and/or combustion dynamics of the combustor 12 from another combustor 12 within the system 10.

In the illustrated embodiment, the asymmetrical irregular configuration 130 has a side wall 132, an asymmetrical irregular end wall 134, and an open mounting interface 96. The side wall 132 may be an annular side wall that has either a variable or constant axial length from a first side 91 to an opposite second side 93 (i.e., diametrically opposite sides 91, 93 relative to axis 11). The asymmetrical irregular end wall 134 may include a plurality of irregular surface features 136 (e.g., recesses and/or protrusions), such as angled portions, curved portions, wavy portions, stepping portions, zigzagging portions, textures, spikes, serrations, or any combination thereof. For example, the irregular surface features 136 may include relatively small scale irregularities 135 (e.g., smaller angles, radii of curvature, depths, etc.) and relatively large scale irregularities 137 (e.g., larger angles, radii of curvature, depths, etc.).

The geometrical characteristics of these irregular surface features 136 of the asymmetrical irregular end wall 134 may be varied in each combustor 12 and/or from one combustor 12 to another. In this manner, the asymmetrical irregular configuration 130 may help to vary acoustic responses, and thereby the combustion dynamics, from one combustor 12 to another. Further, the asymmetrical irregular configuration 130 may help to reduce the possibility of modal coupling between combustors 12 of the system.

Figure 11:
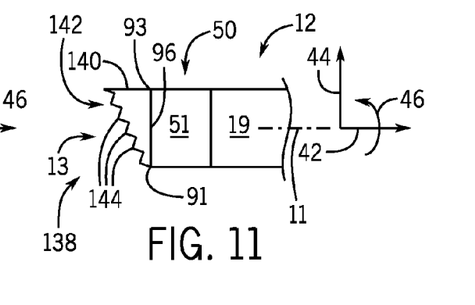
FIG. 11 is a cross-sectional schematic of an embodiment of a combustor having an end cover with a multi-angled step configuration (e.g., stepped end wall) configured to control combustion dynamics and/or modal coupling of combustion dynamics, to reduce the possibility of unwanted vibratory responses in downstream components.

FIG. 11 is a cross-sectional schematic of a combustor 12, illustrating an embodiment of a modified end cover 13 with a multi-angled step configuration 138. In the illustrated embodiment, the multi-angled step configuration 138 of the modified end cover 13 is an asymmetrical configuration, which may be rotated about the axis 11 to vary the acoustics and/or combustion dynamics of an individual combustor 12 or from one combustor 12 to another. In other embodiments, the step configuration 138 of the modified end cover 13 may be symmetrical relative to the axis 11, yet the step configuration 138 may be varied (e.g., altering number of steps, angles, lengths, widths, etc.) to vary the acoustics and/or combustion dynamics of an individual combustor 12 or from one combustor 12 to another.

In the illustrated embodiment, the step configuration 138 has a side wall 140, a stepped end wall 142, and an open mounting interface 96. The side wall 140 may be an annular side wall that has either a variable or constant axial length from a first side 91 to an opposite second side 93 (i.e., diametrically opposite sides 91, 93 relative to axis 11). The stepped end wall 142 may include a plurality of steps 144 (e.g., pairs of adjacent angled wall portions), such as 1, 2, 3, 4, 5, 6, 7, 8, 9, 10, 15, 20, 30, 40, 50, or more steps. Each step 144 may include adjacent angled wall portions, which are acutely angled, obtusely angled, or perpendicularly angled relative to one another. The adjacent angled wall portions of each step 144 also may be acutely angled, obtusely angled, or perpendicularly angled relative to the axis 11, the interface 96, and/or the side wall 140. The adjacent angled wall portions of each step 144 also may have equal or different lengths relative to one another, and the lengths may be the same or different from one step 144 to another along the stepped end wall 142. The stepped end wall 142 also may be described as a zigzagging end wall, a saw tooth shaped end wall, a spiked end wall, a serrated end wall, or any combination thereof.

The geometrical characteristics (e.g., angles, lengths, number, etc.) of these steps 144 of the stepped end wall 142 may be varied in each combustor 12 and/or from one combustor 12 to another. In this manner, the multi-angled step configuration 138 may help to vary acoustic responses, and thereby the combustion dynamics, from one combustor 12 to another. Further, the multi-angled step configuration 138 may help to reduce the possibility of modal coupling between combustors 12 of the system.

Technical effects of the invention include reducing any unwanted vibratory response of components upstream and/or downstream of the combustor 12. The modified end covers 13 are able to achieve these technical effects by varying the end cover 13 geometry of one or more combustors 12. For example, the end covers 13 of multiple combustors 12 can be varied by changing the geometric shape (e.g., angled, concaved, convexed, concavely angled, convexly angled, shaped similar to various polygons, irregularly shaped, irregularly angled, etc.), the geometric characteristics (e.g., dimensions, height, width, depth, length, degree of angle, angle characteristics, etc.), geometric arrangements (e.g., degree of rotation between two end covers, position, location, etc.), and/or any combination thereof. Varying the geometric characteristics of the end covers 13 in various patterns or grouping may help reduce combustion dynamics and/or modal coupling of combustion dynamics, to reduce unwanted vibratory responses in downstream components in a gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a gas turbine engine comprising:
a plurality of combustors circumferentially spaced about a rotational axis of the gas turbine engine, the plurality of combustors including a first combustor and a second combustor;
the first combustor having a first cap assembly; and
a first end cover separate and axially spaced from the first cap assembly, the first end cover comprising a first mounting interface proximal to the first cap assembly and a first end wall opposite the first mounting interface, the first cap assembly and the first mounting interface of the first end cover having a common first diameter; and
a fuel nozzle extending between the first end cover and the first cap assembly;
wherein the first end wall of the first end cover is distal from the first cap assembly and comprises a first geometry; and
the second combustor having a second cap assembly; and
a second end cover separate and axially spaced from the second cap assembly, the second end cover comprising a second mounting interface proximal to the second cap assembly and a second end wall opposite the second mounting interface;
the second cap assembly and the second mounting interface of the second end cover having a common second diameter that is identical to the first diameter; and
a fuel nozzle extending between the second end cover and the second cap assembly;
wherein the second end wall of the second end cover is distal from the second cap assembly and comprises a second geometry;
wherein the first geometry has at least one geometrical difference relative to the second geometry, and wherein at least one the geometrical difference comprises an angular shape or curvature of the end walls extending relative to a longitudinal axis of the respective combustor.

2. The system of claim 1, wherein the at least one geometrical difference is configured to help reduce coherent behavior between the first combustor and the second combustor.

3. The system of claim 1, wherein the at least one geometrical difference is an asymmetrical difference between the first and second end covers that are the same as one another, the first geometry is a first asymmetrical geometry, the second geometry is a second asymmetrical geometry, and the at least one geometrical difference is a rotational offset of the first and second asymmetrical geometries relative to the longitudinal axes of the first and second combustors.

4. The system of claim 3, wherein the first asymmetrical geometry comprises a first angled end wall of the first end cover, and the second asymmetrical geometry comprises a second angled end wall of the second end cover.

5. The system of claim 1, wherein the at least one geometrical difference comprises a different angle, a different radius of curvature, a different number of angled portions, a different number of curved portions, a different number of sides, a different symmetry or asymmetry, a different irregularity, a different rotational orientation about an axis of the first or second combustor, or any combination thereof.

6. The system of claim 1, wherein the at least one geometrical difference comprises a different angle.

7. The system of claim 1, wherein the at least one geometrical difference comprises a different curvature.

8. The system of claim 1, wherein the at least one geometrical difference comprises a different symmetry or asymmetry.

9. The system of claim 1, wherein the at least one geometrical difference comprises a rotational offset of the first and second geometries relative to the longitudinal axes of the first and second combustors.

10. The system of claim 1, wherein the first and second end covers have the respective first and second geometries defining different angled end walls, concave end walls, convex end walls, multi-angled end walls, irregular end walls, or stepped end walls, or any combination thereof.

11. The system of claim 1, wherein the first geometry of the first end cover is configured to at least partially cause first acoustics and/or first combustion dynamics in the first combustor, the second geometry of the second end cover is configured to at least partially cause second acoustics and/or second combustion dynamics in the second combustor, and the at least one geometrical difference between the first and second geometries causes differences between the first and second acoustics and/or the first and second combustion dynamics.

12. A method, comprising: controlling first acoustics and/or first combustion dynamics in a first combustor, the first combustor comprising a first cap assembly; and a first end cover separate and axially spaced from the first cap assembly, the first end cover comprising a first mounting interface proximal to the first cap assembly and a first end wall opposite the first mounting interface, the first cap assembly and the first mounting interface having a common first diameter; and a fuel nozzle extending between the first end cover and the first cap assembly;

wherein the end wall of the first end cover is distal from first cap assembly and comprises a first geometry; and controlling second acoustics and/or second combustion dynamics in a second combustor, the second combustor comprising a second cap assembly; and a second end cover separate and axially spaced from the second cap assembly, the second end cover comprising a second mounting interface proximal to the second cap assembly and a second end wall opposite the second mounting interface;

the second cap assembly and the second mounting interface having a common second diameter that is identical to the first diameter; and a fuel nozzle extending between the second end cover and the second cap assembly;

wherein the end wall of the second end cover is distal from the second cap assembly and comprises a second geometry;

wherein the first geometry has at least one geometrical difference relative to the second geometry, and wherein the geometrical difference comprises an angular shape or curvature of the end cover surfaces extending relative to a longitudinal axis of the respective combustor;

wherein the at least one geometrical difference varies the acoustics of the first combustor relative to the second combustor and/or varies the second combustor dynamics relative to the first combustion dynamics.

13. The method of claim 12, comprising reducing the resonant behavior and/or coherent behavior between the first and second combustors via the at least one difference between the first geometry and the second geometry.

14. The method of claim 12, wherein the at least one difference between the first geometry and the second geometry comprises differences in geometric shape, geometric characteristics, and/or geometric arrangement.

* * * * *